United States Patent
Uemura et al.

(10) Patent No.: US 9,780,717 B2
(45) Date of Patent: Oct. 3, 2017

(54) POWER CONVERSION DEVICE, MOTOR DRIVING DEVICE INCLUDING POWER CONVERSION DEVICE, BLOWER AND COMPRESSOR INCLUDING MOTOR DRIVING DEVICE, AND AIR CONDITIONER, REFRIGERATOR, AND FREEZER INCLUDING BLOWER AND COMPRESSOR

(71) Applicant: Mitsubishi Electric Corporation, Tokyo (JP)

(72) Inventors: Keisuke Uemura, Tokyo (JP); Takuya Shimomugi, Tokyo (JP); Koichi Arisawa, Tokyo (JP); Yosuke Shinomoto, Tokyo (JP); Shigeo Umehara, Tokyo (JP); Shinichiro Ura, Tokyo (JP); Makoto Tanikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 2 days.

(21) Appl. No.: 15/027,735

(22) PCT Filed: Dec. 3, 2013

(86) PCT No.: PCT/JP2013/082509
§ 371 (c)(1),
(2) Date: Apr. 7, 2016

(87) PCT Pub. No.: WO2015/083244
PCT Pub. Date: Jun. 11, 2015

(65) Prior Publication Data
US 2016/0241181 A1 Aug. 18, 2016

(51) Int. Cl.
*H02P 27/08* (2006.01)
*H02M 7/5387* (2007.01)
(Continued)

(52) U.S. Cl.
CPC ............ *H02P 27/08* (2013.01); *F24F 1/0018* (2013.01); *F24F 7/007* (2013.01); *F24F 7/06* (2013.01);
(Continued)

(58) Field of Classification Search
CPC ....................................................... H02P 27/08
(Continued)

(56) References Cited

U.S. PATENT DOCUMENTS 5,250,890 A * 10/1993 Tanamachi ........ H02M 7/53873
318/807
2007/0189048 A1 8/2007 Goto
(Continued)

FOREIGN PATENT DOCUMENTS

JP 09-093948 A 4/1997
JP 2003-209976 A 7/2003
(Continued)

OTHER PUBLICATIONS

International Search Report of the International Searching Authority mailed Mar. 11, 2014 for the corresponding international application No. PCT/JP2013/082509 (and English translation).
(Continued)

*Primary Examiner* — David S Luo
(74) *Attorney, Agent, or Firm* — Posz Law Group, PLC

(57) ABSTRACT

A power conversion device includes an inverter configured by arms including phase upper-arm switching elements and phase lower-arm switching elements, a power-supply shunt resistor, lower-arm shunt resistors, and a control unit that generates drive signals corresponding to the phase upper-arm switching elements and the phase lower-arm switching elements from detection values of the voltage detectors. The power conversion device changes a ratio of time in which all of the upper-arm switching elements are in an ON state and
(Continued)

time in which all of the lower-arm switching elements are in the ON state in one cycle of switching of the inverter according to a modulation ratio.

18 Claims, 13 Drawing Sheets

(51) Int. Cl.
| | |
|---|---|
| *F24F 1/00* | (2011.01) |
| *F24F 7/007* | (2006.01) |
| *F24F 7/06* | (2006.01) |
| *F25B 31/02* | (2006.01) |
| *H02M 7/537* | (2006.01) |
| *H02P 21/18* | (2016.01) |
| *H02M 1/00* | (2006.01) |
| *F25D 17/06* | (2006.01) |

(52) U.S. Cl.
CPC ............ *F25B 31/02* (2013.01); *H02M 7/537* (2013.01); *H02M 7/5387* (2013.01); *H02P 21/18* (2016.02); *F25D 17/062* (2013.01); *F25D 2317/0681* (2013.01); *H02M 2001/0009* (2013.01); *H02M 2001/0048* (2013.01); *H02M 2007/53876* (2013.01); *Y02B 70/1491* (2013.01)

(58) Field of Classification Search
USPC .................................................. 318/504, 494
See application file for complete search history.

(56) References Cited

U.S. PATENT DOCUMENTS

| | | |
|---|---|---|
| 2011/0062903 A1 | 3/2011 | Li et al. |
| 2012/0163046 A1 | 6/2012 | Hibino |

FOREIGN PATENT DOCUMENTS

| | | |
|---|---|---|
| JP | 2006-067747 A | 3/2006 |
| JP | 2006-101685 A | 4/2006 |
| JP | 2006-353073 A | 12/2006 |
| JP | 2007-236188 A | 9/2007 |
| JP | 2010-029048 A | 2/2010 |
| JP | 2010-063239 A | 3/2010 |
| JP | 2011-087456 A | 4/2011 |
| JP | 2011-091992 A | 5/2011 |
| JP | 2011-234428 A | 11/2011 |
| JP | 2012-157103 A | 8/2012 |

OTHER PUBLICATIONS

Office Action mailed Jan. 4, 2017 issued in corresponding JP patent application No. 2015-551322 (and English translation).

* cited by examiner

|  | 3a | 3b | 3c |
|----|----|----|----|
| V0 | 0 | 0 | 0 |
| V1 | 1 | 0 | 0 |
| V2 | 0 | 1 | 0 |
| V3 | 0 | 0 | 1 |
| V4 | 1 | 1 | 0 |
| V5 | 0 | 1 | 1 |
| V6 | 1 | 0 | 1 |
| V7 | 1 | 1 | 1 |

POWER CONVERSION DEVICE, MOTOR DRIVING DEVICE INCLUDING POWER CONVERSION DEVICE, BLOWER AND COMPRESSOR INCLUDING MOTOR DRIVING DEVICE, AND AIR CONDITIONER, REFRIGERATOR, AND FREEZER INCLUDING BLOWER AND COMPRESSOR

CROSS REFERENCE TO RELATED APPLICATION

This application is a U.S. national stage application of International Patent Application No. PCT/JP2013/082509 filed on Dec. 3, 2013, the disclosure of which is incorporated herein by reference.

TECHNICAL FIELD

The present invention relates to a power conversion device, a motor driving device including the power conversion device, a blower and a compressor including the motor driving device, and an air conditioner, a refrigerator, and a freezer including the blower and the compressor.

BACKGROUND

In a power conversion device that generates a three-phase AC voltage and supplies the three-phase AC voltage to a load by combining ON/OFF states of switching elements configuring a three-phase inverter of a PWM modulation system, the power conversion device detects phase currents flowing to a three-phase load such as a motor and controls the load on the basis of the phase currents.

As means for detecting the phase currents flowing to the three-phase load, there are a current sensor and a shunt resistor connected in series to the switching elements configuring the inverter.

As the configuration in which the shunt resistor is provided, there are a configuration in which a power-supply shunt resistor that detects an electric current between a DC power supply and an inverter device is provided and a configuration in which a lower-arm shunt resistor that detects a phase current of a relevant phase is provided between a lower-arm switching element and a minus side of the DC power supply.

In the configurations in which the power-supply shunt resistor and the lower-arm shunt resistor are provided, it is necessary to specify a phase current detected for each of phases. Control software is complicated. In the configuration in which the power-supply shunt resistor is provided, when only an electric current for one phase can be detected, it is necessary to perform energization control to detect electric currents for two phases. That is, a period in which the phase currents are detected in one switching cycle is limited to a narrow range. Therefore, an inverter device is disclosed that can detect, for example, by "providing a power-supply shunt resistor and lower-arm shunt resistors for at least two phases and detecting, with the power-supply shunt resistor, a phase current that cannot be detected by the lower-arm shunt resistors", the phase current with simple control software (e.g., Patent Literature 1).

PATENT LITERATURE

Patent Literature 1: Japanese Patent Application Laid-Open No. 2006-67747

In the configuration in which the shunt resistor is provided, it is necessary to set a resistance value of the shunt resistor to a sufficiently small resistance value not to affect the operation of the inverter and not to consume excess electric power. To detect an electric current flowing to the shunt resistor, it is necessary to amplifier a voltage across both ends of the shunt resistor and take the voltage into control means. Therefore, it is necessary to provide amplifying means at the pre-stage of the control means.

The technology described in the above Patent Literature 1 is the configuration including the lower-arm shunt resistor and the power-supply shunt resistor. It is necessary to amplify voltages across both ends of the lower-arm shunt resistor and the power-supply shunt resistor and take the voltages across both the ends into the control means. To further explain about the number of amplifying means, in a configuration in which lower-arm shunt resistors for two phases and a power-supply shunt resistor are provided, at least three amplifying means are necessary. In a configuration in which lower-arm shunt resistors for three phases and a power-supply shunt resistor are provided, at least four amplifying means are necessary.

Therefore, in the technology described in Patent Literature 1, there is a problem in that an increase in the size and an increase in the costs of the device are caused according to the increase of the amplifying means, suppression of the fluctuation in the detection value, the complication of the control procedure, and the like.

SUMMARY

The present invention has been devised in view of the above and it is an object of the present invention to provide a power conversion device that can extend a detection period of phase currents without causing an increase in the size and an increase in the costs of the device, a motor driving device including the power conversion device, a blower and a compressor including the motor driving device, and an air conditioner, a refrigerator, and a freezer including the blower and the compressor.

In order to solve the problems and achieve the object, according to an aspect of the present invention, there is provided a power conversion device that converts DC power supplied from a DC power supply into AC power, the power conversion device including: an inverter configured by connecting, in parallel, arms including phase upper-arm switching elements and phase lower-arm switching elements; a power-supply shunt resistor provided between a negative voltage side of the DC power supply and the inverter; lower-arm shunt resistors respectively provided between the phase lower-arm switching elements for at least two phases and the power-supply shunt resistor; a voltage detector that detects voltages between connection points of the phase lower-arm switching elements and the lower-arm shunt resistors and the negative voltage side of the DC power supply; and a control unit that generates drive signals corresponding to the phase upper-arm switching elements and the phase lower-arm switching elements from detection values of the voltage detector, wherein the power conversion device changes a ratio of time in which all of the upper-arm switching elements are in an ON state and time in which all of the lower-arm switching elements are in the ON state in one cycle of switching of the inverter.

According to the present invention, there is an effect that it is possible to extend a detection period of phase currents without causing an increase in the size and an increase in the costs of the device and suppress a switching loss while attaining improvement of accuracy of control based on the phase currents.

DETAILED DESCRIPTION

Exemplary embodiments of the present invention are explained below with reference to the accompanying drawings. Note that the present invention is not limited by the embodiments explained below.

First Embodiment

Figure 1:
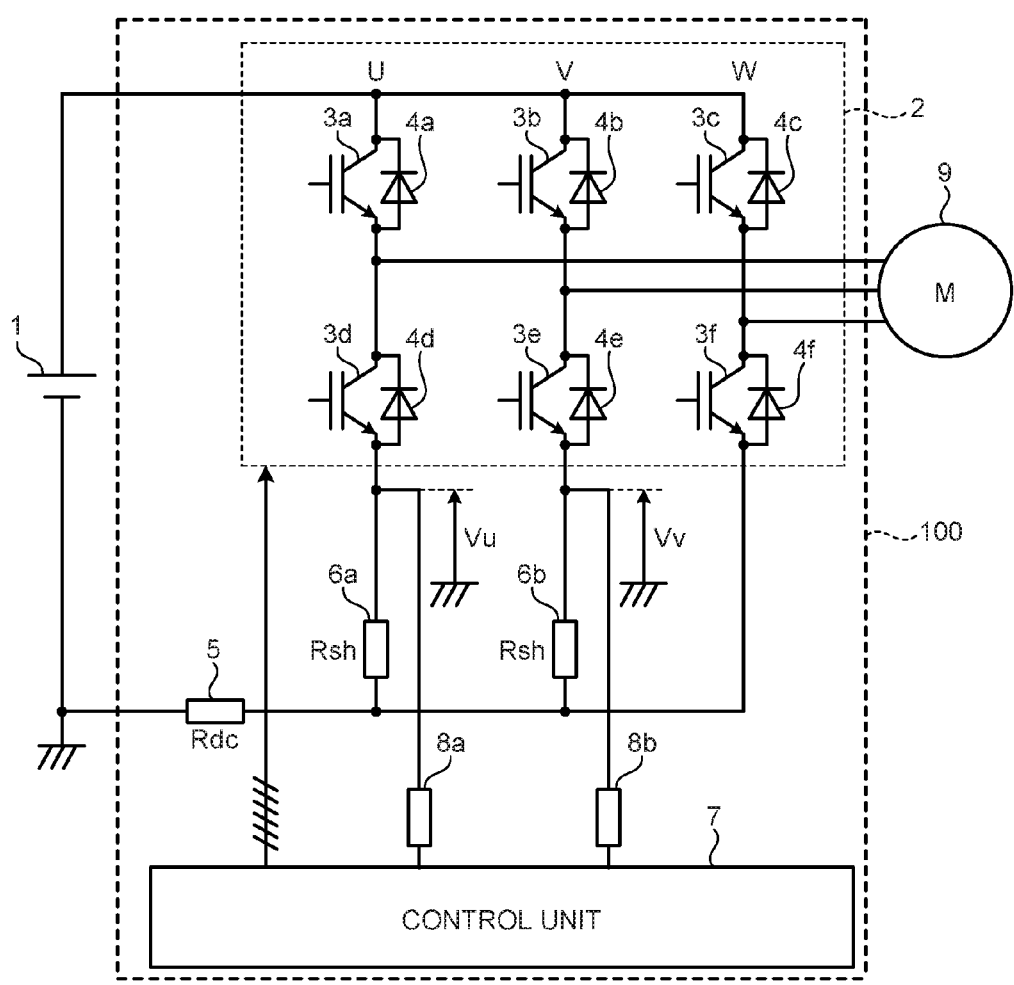
FIG. 1 is a diagram showing a configuration example of a power conversion device according to a first embodiment.

FIG. 1 is a diagram showing a configuration example of a power conversion device according to a first embodiment. In the example shown in FIG. 1, a power conversion device 100 according to the first embodiment is configured to convert DC power supplied from a DC power supply 1 into three-phase AC power supplied to a load device (in the example shown in FIG. 1, a motor) 9.

As shown in FIG. 1, the power conversion device 100 includes, as main components for supplying three-phase AC power to the motor 9, an inverter 2 configured by three arms including upper-arm switching elements 3a to 3c (3a: a U phase, 3b: a V phase, and 3c: a W phase) and lower-arm switching elements 3d to 3f (3d: the U phase, 3e: the V phase, and 3f: the W phase) and a control unit 7 that generates six drive signals corresponding to the phase upper-arm switching elements 3a to 3c and the phase lower-arm switching elements 3d to 3f and outputs the drive signals respectively to the phase upper-arm switching elements 3a to 3c and the phase lower-arm switching elements 3d to 3f. The phase upper-arm switching elements 3a to 3c and the phase lower-arm switching elements 3d to 3f include free-wheeling diodes 4a to 4f (4a: a U-phase upper arm, 4b: a V-phase upper arm, 4c: a W-phase upper arm, 4d: a U-phase lower arm, 4e: a V-phase lower arm, and 4f: a W-phase lower arm) connected in reverse parallel to one another.

The control unit 7 is configured by, for example, a microcomputer or a CPU and is computation/control means for converting an input analog voltage signal into a digital value and performing computation/control corresponding to a control application of the motor 9.

The power conversion device 100 according to the first embodiment includes a power-supply shunt resistor 5 provided between a negative voltage side (in the example shown in FIG. 1, GND) of the DC power supply 1 and the inverter 2, lower-arm shunt resistors 6a and 6b (6a: the U phase and 6b: the V phase) respectively provided between the phase lower-arm switching elements 3d and 3e of two arms (the U phase and the V phase) among the three arms and the power-supply shunt resistor 5, and phase lower-arm voltage detection units 8a and 8b (8a: the U phase and 8b: the V phase) that detect voltages (hereinafter referred to as "phase lower-arm voltages") Vu and Vv between connection points of the phase lower-arm switching elements 3d and 3e and the lower-arm shunt resistors 6a and 6b and a negative voltage side (GND) of the DC power supply 1. Note that, in the example shown in FIG. 1, a resistance value of the power-supply shunt resistor 5 is represented as Rdc and a resistance value of the lower-arm shunt resistors 6a and 6b is represented as Rsh.

Figure 2:
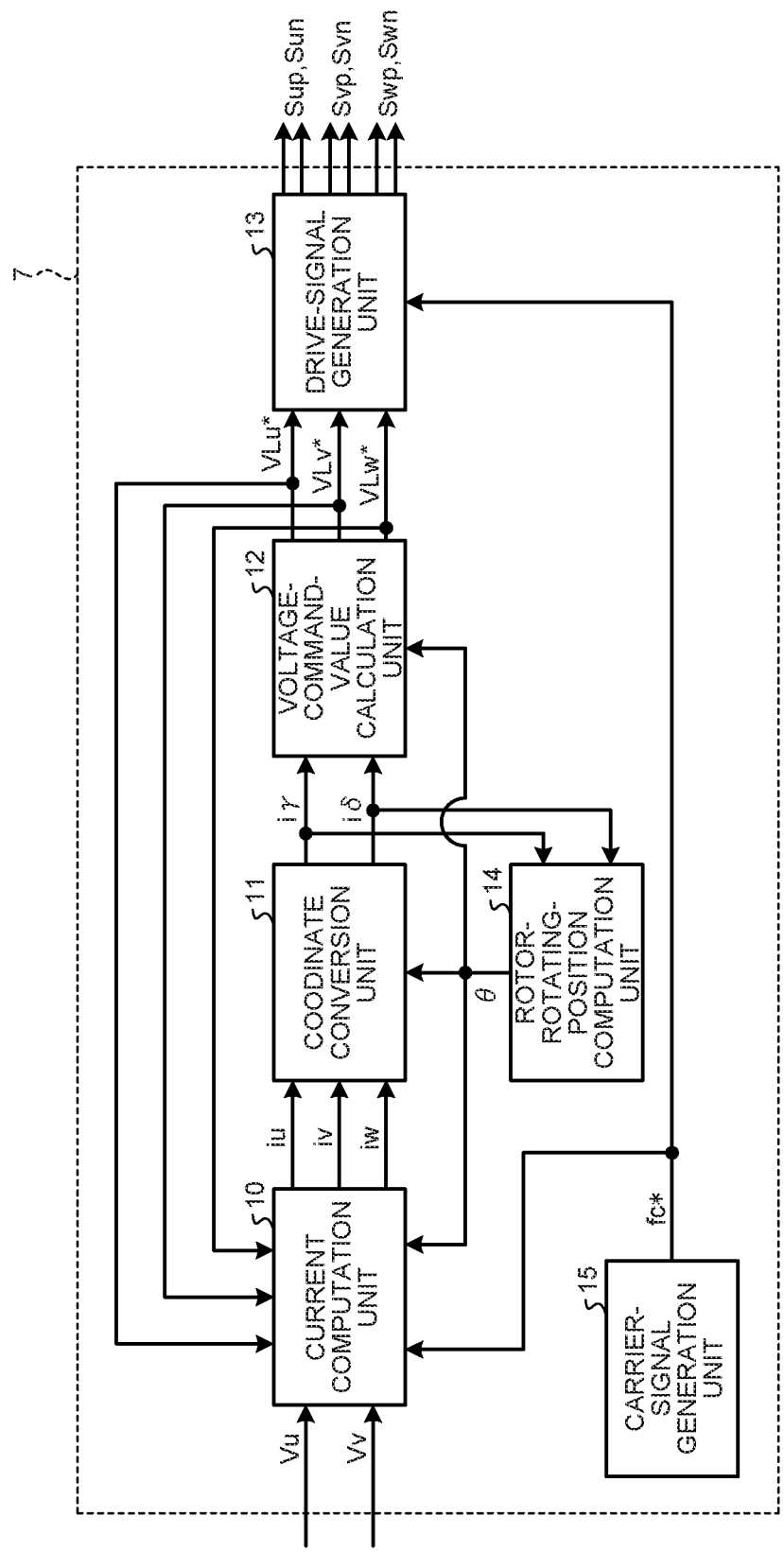
FIG. 2 is a diagram showing a configuration example of a control unit of the power conversion device according to the first embodiment.

FIG. 2 is a diagram showing a configuration example of the control unit of the power conversion device according to the first embodiment. The control unit 7 of the power conversion device 100 according to the first embodiment includes a current computation unit 10 that computes, on the basis of the phase lower-arm voltages Vu and Vv detected by the phase lower-arm voltage detection units 8a and 8b, phase currents iu, iv, and iw flowing to phase winding wires of the motor 9, a coordinate conversion unit 11 that converts the phase currents iu, iv, and iw, which are outputs of the current computation unit 10, from a three-phase fixed coordinate system into a two-phase rotation coordinate system, a voltage-command-value calculation unit 12 that calculates, on the basis of currents iγ and iδ after the coordinate conversion obtained by coordinate-converting the phase currents iu, iv, and iw with the coordinate conversion unit 11, phase voltage command values VLu*, VLv*, and VLw* output from the inverter 2 to the phase winding wires of the motor 9, a drive-signal generation unit 13 that generates, on the basis of the phase voltage command values VLu*, VLv*, and VLw* output from the voltage-command-value calculation unit 12, drive signals Sup, Sun, Svp, Svn, Swp, and Swn output to the phase upper-arm switching elements 3a to 3c and the phase lower-arm switching elements 3d to 3f, a rotor-rotating-position computation unit 14 that computes a rotor rotating position θ of the motor 9 from the currents iγ and iδ A after the coordinate conversion, and a carrier-signal generation unit 15 that generates a carrier signal fc* such as a triangular wave or a saw-tooth wave serving as a reference frequency of the drive signals Sup, Sun, Svp, Svn, Swp, and Swn.

The current computation unit 10 discriminates, using the phase voltage command value VLu*, VLv*, and VLw* output from the voltage-command-value calculation unit 12, the carrier signal fc* output from the carrier-signal generation unit 15, and the rotor rotating position θ computed by the rotor-rotating-position computation unit 14, ON/OFF states of the phase upper-arm switching elements 3a to 3c in a space vector modulation system explained below and computes the phase currents iu, iv, and iw corresponding to the ON/OFF states of the phase upper-arm switching elements 3a to 3c. A computation method for the phase currents iu, iv, and iw corresponding to the ON/OFF states of the phase upper-arm switching elements 3a to 3c in the space vector modulation system is explained below.

The coordinate conversion unit 11 coordinate-converts, using the rotor rotating position θ computed by the rotor-rotating-position computation unit 14, the phase currents iu, iv, and iw represented by the three-phase fixed coordinate system into a two-phase rotation coordinate system and calculates the currents iγ and iδ after the coordinate conversion.

The voltage-command-value calculation unit 12 calculates, according to the coordinate-converted currents iγ and iδ output from the coordinate conversion unit 11, the phase voltage command values VLu*, VLv*, and VLw* converted into on-duties (i.e., ratios of ON times of the phase upper-arm switching elements 3a to 3c and the phase lower-arm switching elements 3d to 3f in one switching cycle) of the drive signals Sup, Sun, Svp, Svn, Swp, and Swn output from the drive-signal generation unit 13.

The drive-signal generation unit 13 compares the phase voltage command values VLu*, VLv*, and VLw* output from the voltage-command-value calculation unit 12 and the carrier signal fc* output from the carrier-signal generation unit 15 and generates, according to a magnitude relation between the phase voltage command values VLu*, VLv*, and VLw* and the carrier signal fc*, the drive signals Sup, Sun, Svp, Svn, Swp, and Swn output to the switching elements 3a to 3f.

The rotor-rotating-position computation unit 14 computes the rotor rotating position θ on the basis of the currents iγ and iδ after the coordinate conversion and passes the rotor rotating position θ to the coordinate conversion unit 11 and the voltage-command-value calculation unit 12.

Note that the configuration of the control unit 7 explained above is a configuration example for controlling the motor 9 functioning as the load device. The present invention is not limited by the configuration and a control method of the control unit 7.

Subsequently, the space vector modulation system for generating drive signals to the phase upper-arm switching elements 3a to 3c and the phase lower-arm switching elements 3d to 3f by PWM modulation is explained.

Figures 3, 4:
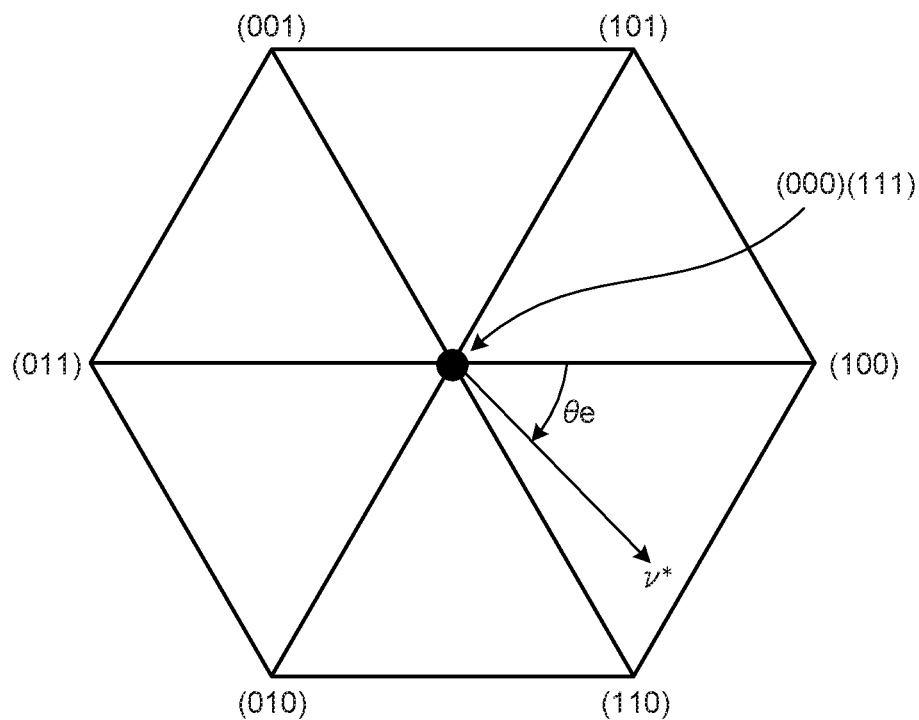
FIG. 3 is a schematic diagram showing a relation between ON/OFF states of phase upper-arm switching elements in a space vector modulation system and an output voltage vector of an inverter.
FIG. 4 is a diagram showing a definition of an output voltage vector of an inverter.

FIG. 3 is a schematic diagram showing ON/OFF states of the phase upper-arm switching elements in the space vector modulation system and an output voltage vector of the inverter. FIG. 4 is a diagram showing a definition of an output voltage vector of the inverter 2. Note that, in the example shown in FIG. 3 and FIG. 4, the ON state of the phase upper-arm switching elements 3a to 3c is defined as "1" and the OFF state is defined as "0".

As shown in FIG. 3 and FIG. 4, as the ON/OFF states of the phase upper-arm switching elements 3a to 3c, there are two states: the ON state (i.e., "1") and the OFF state (i.e., "0"). According to combinations of the ON/OFF states of the phase upper-arm switching elements 3a to 3c, when the output voltage vector of the inverter 2 is defined in a form of ((a state of the U-phase upper-arm switching element 3a)(a state of the V-phase upper-arm switching element 3b)(a state of the W-phase upper-arm switching element 3c), there are eight vectors V0 (000), V1 (100), V2 (010), V3 (001), V4 (110), V5 (011), V6 (101), and V7 (111). Among the output voltage vectors of the inverter 2, V0 (000) and V7 (111) not having magnitude are referred to as zero vectors. The other vectors V1 (100), V2 (010), V3 (001), V4 (110), V5 (011), and V6 (101) having equal magnitude and having a phase difference of 60 degrees one another are referred to as real vectors.

The control unit 7 combines the zero vectors V0 and V7 and the real vectors V1 to V6 in any combinations and generates drive signals of a three-phase PWM voltage corresponding to the phase upper-arm switching elements 3a to 3c and the phase lower-arm switching elements 3d to 3f.

In general, the control unit 1 generates the drive signals for the three-phase PWM voltage to set a time ratio of outputs of zero vectors V0 and V7 by the inverter 2 to 1:1. However, it is possible to change the time ratio of the outputs of the zero vectors V0 and V7 taking into account the fact that the zero vectors V0 and V7 are voltage vectors, both of which do not have size, although having different switching patterns.

A computation method for the phase currents iu, iv, and iw in the power conversion device 100 according to the first embodiment is explained with reference to FIG. 5 to FIG. 11.

Figure 5:
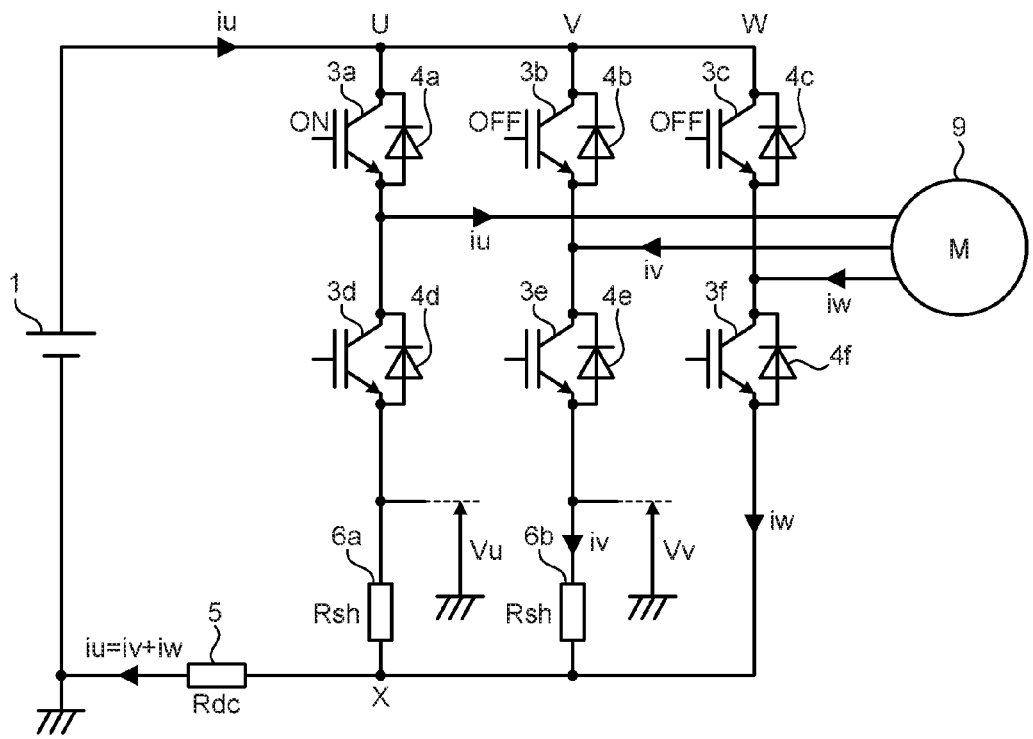
FIG. 5 is a diagram showing electric currents flowing to units of the inverter when the output voltage vector of the inverter is a real vector V1 (100).

FIG. 5 is a diagram showing electric currents flowing to the units of the inverter when the output voltage vector of the inverter is the real vector V1 (100). In an example shown in FIG. 5, the currents iu, iv, and iw flowing from a high potential side to a low potential side of the phase winding wires of the motor 9 are set. Note that, in examples shown in the figures referred to below, descriptions are the same as the description in FIG. 5.

As shown in FIG. 5, when the output voltage vector of the inverter 2 is the real vector V1 (100), the U-phase current iu flows from the positive voltage side of the DC power supply 1 to the motor 9 via the U-phase upper-arm switching element 3a, the V-phase current iv flows from the motor 9 to the negative voltage side of the DC power supply 1 via the V-phase lower-arm switching element 3e, the V-phase lower-arm shunt resistor 6b, and the power-supply shunt resistor 5, and the W-phase current iw flows to the negative voltage side of the DC power supply 1 via the W-phase lower-arm switching element 3f and the power-supply shunt resistor 5. At this point, the U-phase lower-arm voltage Vu and the V-phase lower-arm voltage Vv can be represented by the following Formulas (1) and (2).

$$Vu = iu \times Rdc \quad (1)$$

$$Vv = iu \times Rdc + iv \times Rsh \quad (2)$$

When the first law of Kirchhoff is applied at an X point shown in FIG. 4, the following Formula is led.

$$iu = iv + iw \quad (3)$$

That is, the phase currents iu, iv, and iw can be calculated using the above Formulas (1), (2), and (3).

Figure 6:
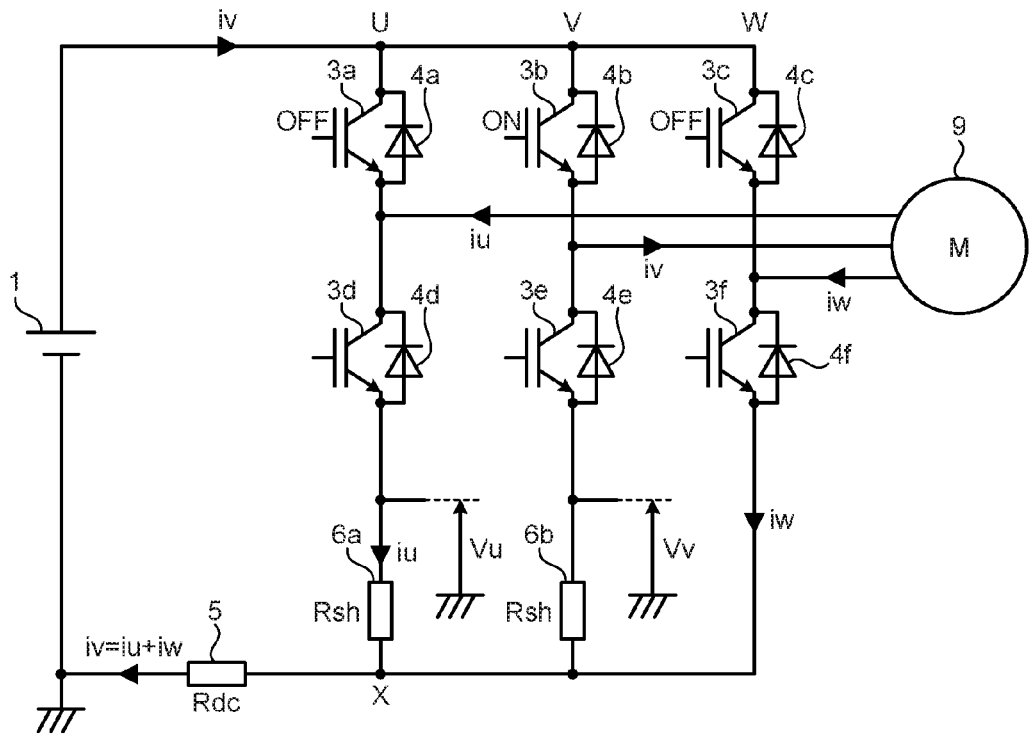
FIG. 6 is a diagram showing electric currents flowing to the units of the inverter when the output voltage vector of the inverter is a real vector V2 (010).

FIG. 6 is a diagram showing electric currents flowing to the units of the inverter when the output voltage vector of the inverter is the real vector V2 (010).

As shown in FIG. 6, when the output voltage vector of the inverter 2 is the real vector V2 (010), the V-phase current iv flows from the positive voltage side of the DC power supply 1 to the motor 9 via the V-phase upper-arm switching element 3b, the U-phase current iu flows from the motor 9 to the negative voltage side of the DC power supply 1 via the U-phase lower-arm switching element 3d, the U-phase lower-arm shunt resistor 6a, and the power-supply shunt resistor 5, and the W-phase current iw flows to the negative voltage side of the DC power supply 1 via the W-phase lower-arm switching element 3f and the power-supply shunt resistor 5. At this point, the U-phase lower-arm voltage Vu and the V-phase lower-arm voltage Vv can be represented by the following Formulas (4) and (5).

$$Vu = iv \times Rdc + iu \times Rsh \quad (4)$$

$$Vv = iv \times Rdc \quad (5)$$

When the first law of Kirchhoff is applied at an X point shown in FIG. 5, the following Formula is led.

$$iv = iu + iw \quad (6)$$

That is, the phase currents iu, iv, and iw can be calculated using the above Formulas (4), (5), and (6).

Figure 7:
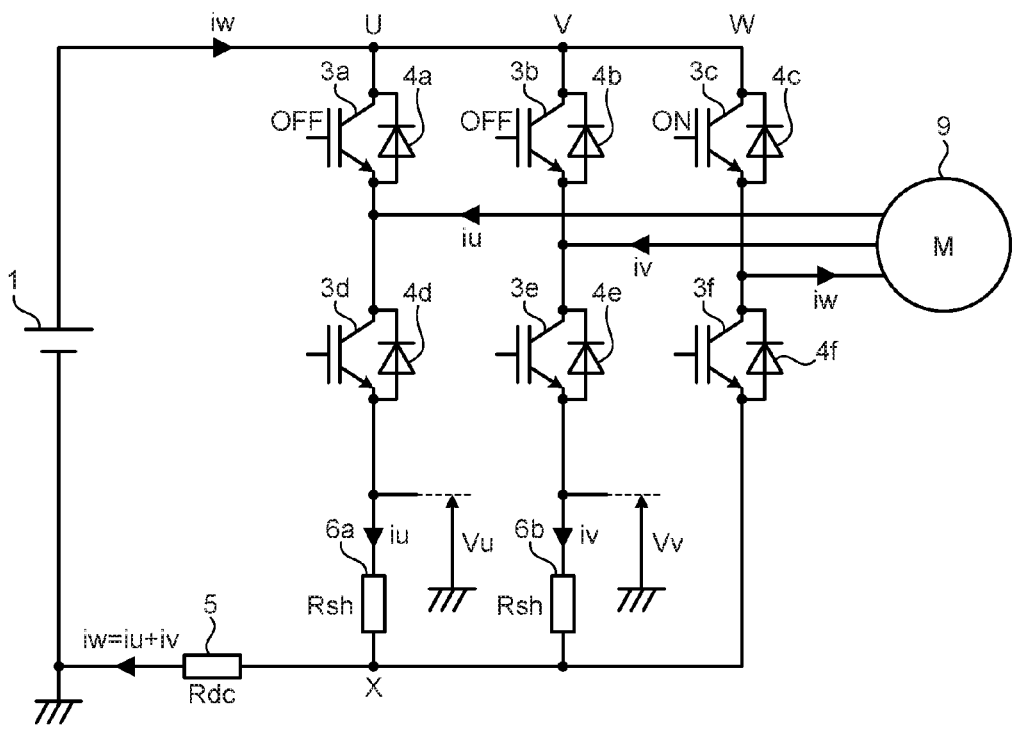
FIG. 7 is a diagram showing electric currents flowing to the units of the inverter when the output voltage vector of the inverter is a real vector V3 (001).

FIG. 7 is a diagram showing electric currents flowing to the units of the inverter when the output voltage vector of the inverter is the real vector V3 (001).

As shown in FIG. 7, when the output voltage vector of the inverter 2 is the real vector V3 (001), the W-phase current iw flows from the positive voltage side of the DC power supply 1 to the motor 9 via the W-phase upper-arm switching element 3c, the U-phase current iu flows from the motor 9 to the negative voltage side of the DC power supply 1 via the U-phase lower-arm switching element 3d, the U-phase lower-arm shunt resistor 6a, and the power-supply shunt resistor 5, and the V-phase current iv flows to the negative voltage side of the DC power supply 1 via the V-phase lower-arm switching element 3e, the V-phase lower-arm shunt resistor 6b, and the power-supply shunt resistor 5. At this point, the U-phase lower-arm voltage Vu and the V-phase lower-arm voltage Vv can be represented by the following Formulas (7) and (8).

$$Vu = iw \times Rdc + iu \times Rsh \quad (7)$$

$$Vv = iw \times Rdc + iv \times Rsh \quad (8)$$

When the first law of Kirchhoff is applied at an X point shown in FIG. 7, $$iw = iu + iv \quad (9)$$

That is, the phase currents iu, iv, and iw can be calculated using the above Formulas (7), (8), and (9).

Figure 8:
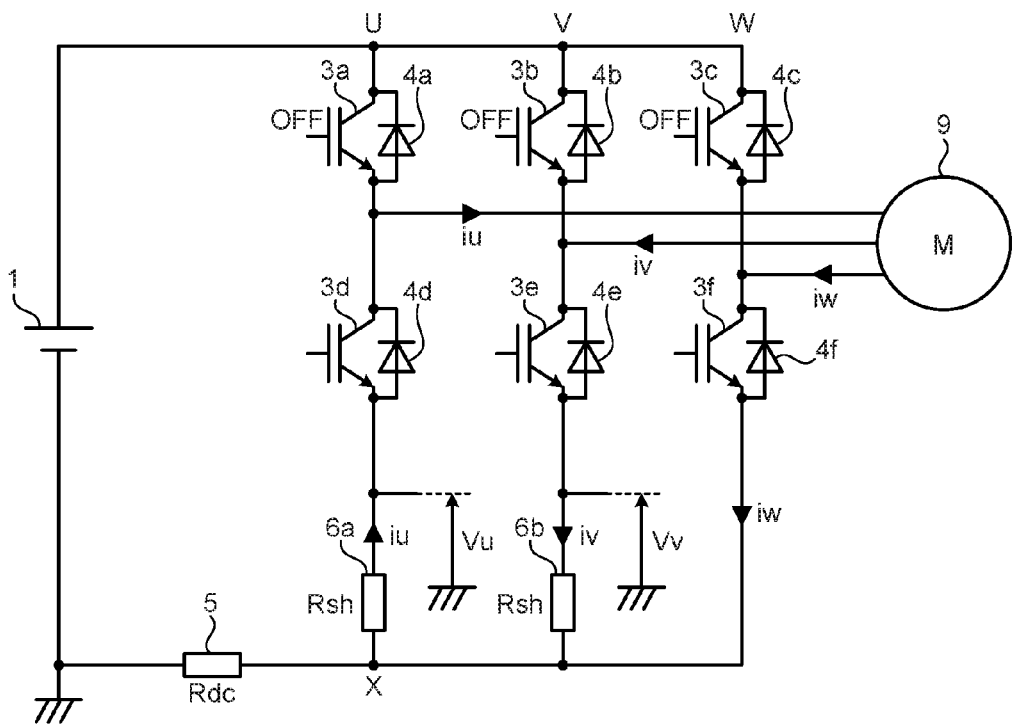
FIG. 8 is a diagram showing electric currents flowing to the units of the inverter when the output voltage vector of the inverter is a zero vector V0 (000).

FIG. 8 is a diagram showing electric currents flowing to the units of the inverter when the output voltage vector of the inverter is the zero vector V0 (000). In an example shown in FIG. 8, as an example, electric currents flowing to the inverter 2 when the output voltage vector shifts from the real vector V1 (100) to the zero vector V0 (000) is shown.

As shown in FIG. 8, when the output voltage vector of the inverter 2 shifts from the real vector V1 (100) to the zero vector V0 (000), an electric current hardly flows to the power-supply shunt resistor 5 and an electric potential at the X point is approximately zero. At this point, the U-phase current iu flows from the X point to the motor 9 via the U-phase lower-arm shunt resistor 6a and the freewheeling diode 4d, the V-phase current iv flows from the motor 9 to the X point via the V-phase lower-arm switching element 3e and the V-phase lower-arm shunt resistor 6b, and the W-phase current iw flows to the X point via the W-phase lower-arm switching element 3f. At this point, the U-phase lower-arm voltage Vu and the V-phase lower-arm voltage Vv can be represented by the following two formulas.

$$Vu = (-iu) \times Rsh \quad (10)$$

$$Vv = iv \times Rsh \quad (11)$$

When the first law of Kirchhoff is applied at the X point, the following formula is led.

$$iu = iv + iw \quad (12)$$

That is, the phase currents iu, iv, and iw can be calculated using the above Formulas (10), (11), and (12).

As explained above, in the power conversion device 100 according to this embodiment, when the output voltage vector of the inverter 2 is the real vectors V1 (100), V2 (010), and V3 (001) and the zero vector V0 (000), the phase currents iu, iv, and iw flowing to the phase winding wires of the motor 9 can be calculated by detecting the U-phase lower-arm voltage Vu and the V-phase lower-arm voltage Vv.

Figure 9:
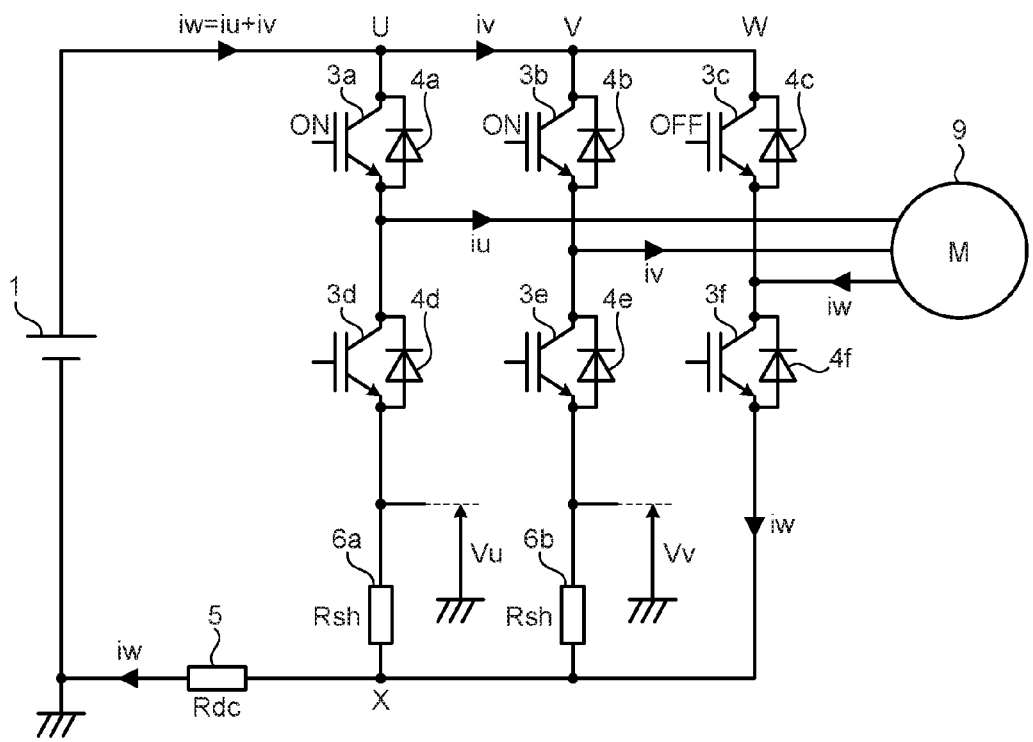
FIG. 9 is a diagram showing electric currents flowing to the units of the inverter when the output voltage vector of the inverter is a real vector V4 (110).

FIG. 9 is a diagram showing electric currents flowing to the units of the inverter when the output voltage vector of the inverter is the real vector V4 (110).

As shown in FIG. 9, when the output voltage vector of the inverter 2 is the real vector V4 (110), the U-phase current iu flows from the positive voltage side of the DC power supply 1 to the motor 9 via the U-phase upper-arm switching element 3a, the V-phase current iv flows to the motor 9 via the V-phase upper-arm switching element 3b, and the W-phase current iw flows from the motor 9 to the negative voltage side of the DC power supply 1 via the W-phase lower-arm switching element 3f and the power-supply shunt resistor 5. At this point, the U-phase lower-arm voltage Vu and the V-phase lower-arm voltage Vv can be represented by the following Formulas (13) and (14).

$$Vu = iw \times Rdc \quad (13)$$

$$Vv = iw \times Rdc \quad (14)$$

When the motor 9 is a three-phase balanced load, according to an equilibrium condition of phase currents, the following formula is led.

$$iu + iv = iw \quad (15)$$

$$iu = iv = (1/2)iw \quad (16)$$

That is, when the output voltage vector of the inverter 2 is the real vector V4 (110) and the motor 9 is the three-phase balanced load, the phase currents iu, iv, and iw can be calculated using one of the above Formulas (13) and (14) and Formula (16).

Figure 10:
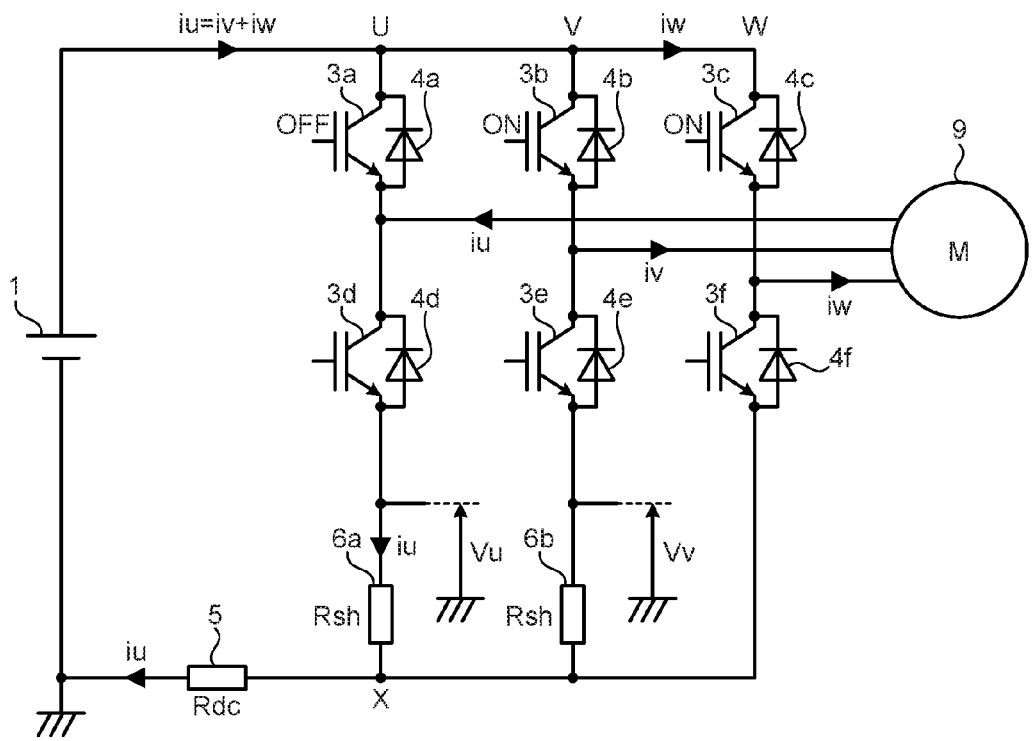
FIG. 10 is a diagram showing electric currents flowing to the units of the inverter when the output voltage vector of the inverter is a real vector V5 (011).

FIG. 10 is a diagram showing electric currents flowing to the units of the inverter when the output voltage vector of the inverter is the real vector V5 (011).

As shown in FIG. 10, when the output voltage vector of the inverter 2 is the real vector V5 (011), the V-phase current iv flows from the positive voltage side of the DC power supply 1 to the motor 9 via the V-phase upper-arm switching element 3b, the W-phase current iw flows to the motor 9 via the W-phase upper-arm switching element 3c, and the U-phase current iu flows from the motor 9 to the negative voltage side of the DC power supply 1 via the U-phase lower-arm switching element 3d, the U-phase lower-arm shunt resistor 6a, and the power-supply shunt resistor 5. At this point, the U-phase lower-arm voltage Vu and the V-phase lower-arm voltage Vv can be represented by the following Formula (17) and (18).

$$Vu = iu \times Rdc + iu \times Rsh \quad (17)$$

$$Vv = iu \times Rdc \quad (18)$$

When the motor 9 is the three-phase balanced load, according to the equilibrium condition of phase currents, the following formula is led.

$$iv + iw = iu \quad (19)$$

$$iv = iw = (1/2)iu \quad (20)$$

That is, when the motor 9 is the three-phase balanced load, the phase currents iu, iv, and iw can be calculated using one of the above Formulas (17) and (18) and Formula (20).

Figure 11:
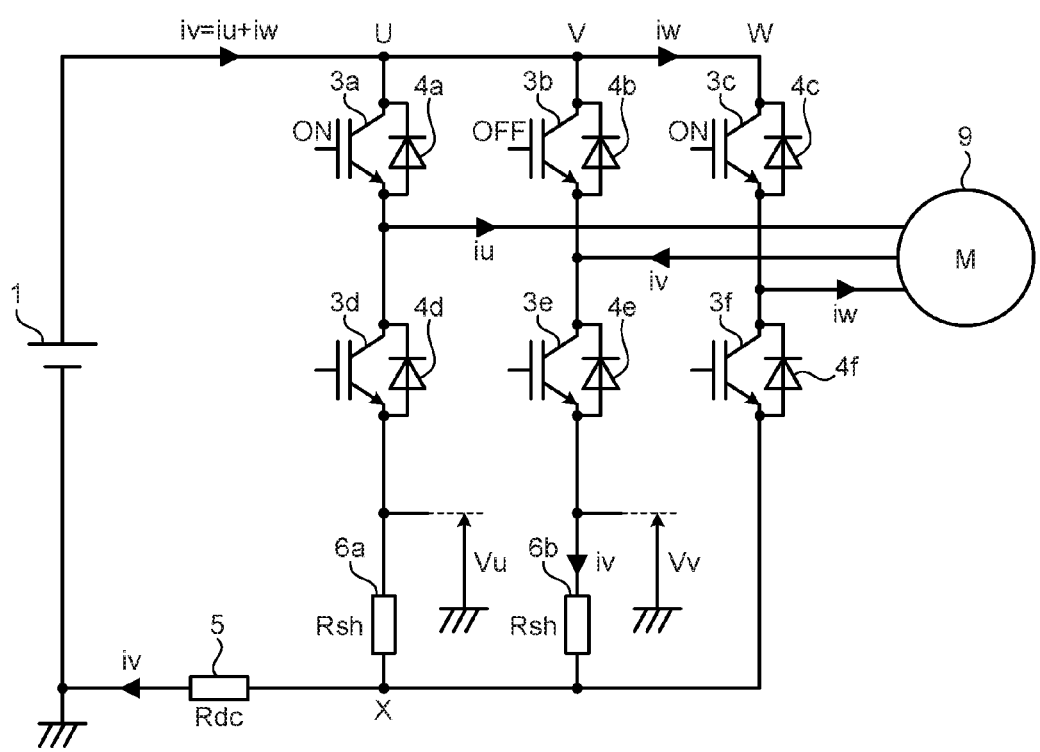
FIG. 11 is a diagram showing electric currents flowing to the units of the inverter when the output voltage vector of the inverter is a real vector V6 (101).

FIG. 11 is a diagram showing electric currents flowing to the units of the inverter when the output voltage vector of the inverter is the real vector V6 (101).

As shown in FIG. 11, when the output voltage vector of the inverter 2 is the real vector V6 (101), the U-phase current iu flows from the positive voltage side of the DC power supply 1 to the motor 9 via the U-phase upper-arm switching element 3a, the W-phase current iw flows to the motor 9 via the W-phase upper-arm switching element 3c, and the V-phase current iv flows from the motor 9 to the negative voltage side of the DC power supply 1 via the V-phase lower-arm switching element 3e, the V-phase lower-arm shunt resistor 6b, and the power-supply shunt resistor 5. At this point, the U-phase lower-arm voltage Vu and the V-phase lower-arm voltage Vv can be represented by the following Formulas (21) and (22).

$$Vu = iv \times Rdc \quad (21)$$

$$Vv = iv \times Rdc + iv \times Rsh \quad (22)$$

When the motor 9 is the three-phase balanced load, according to the equilibrium condition of phase currents, the following Formula is led.

$$iu + iw = iv \quad (23)$$

$$iu = iw = (1/2)iv \quad (24)$$

That is, when the motor 9 is the three-phase balanced load, the phase currents iu, iv, and iw can be calculated using one of the above Formulas (21) and (22) and Formula (24).

That is, when the output voltage vector of the inverter 2 is the real vector V6 (101) and the motor 9 is the three-phase balanced load, the phase currents iu, iv, and iw can be calculated using one of the above Formulas (21) and (22) and Formula (24).

Not only in the ON/OFF states of the phase upper-arm switching elements 3a to 3c, that is, when the output voltage vector of the inverter 2 is the zero vector V0 but also when the output voltage vector of the inverter is the real vectors V1 to V6, the phase currents can be calculated on the basis of the two phase lower-arm voltages. It is possible to attain improvement of accuracy of the control based on the phase currents.

Further, when the time ratio of the outputs of the zero vectors V0 and V7 is changed, in one cycle of the carrier signal fc*, because types of voltage vectors output by the inverter 2 decrease, the number of times of switching also decreases. It is possible to suppress a loss in the inverter 2.

As an example, a range in which the rotor rotating position θ is equal to or larger than 0 rad and equal to or smaller than π/3 is explained. When the time ratio of the outputs of the zero vectors V0 and V7 is set to 1:1, the inverter 2 switches the output voltage vectors in the order of V0 (000)→V1 (100)→V4 (110)→V7 (111)→V4 (110)→V1 (100)→V0 (000). On the other hand, when the time ratio of the outputs of the zero vectors V0 and V7 is set to 1:0, the inverter 2 switches the output voltage vectors in the order of V0 (000)→V1 (100)→V4 (110)→V4 (110)→V1 (100) →V0 (000). Therefore, when the time ratio of the outputs of the zero vectors V0 and V7 is set to 1:0 (i.e., time in which all of the upper-arm switching elements are in the ON state in one cycle of the switching of the inverter is zero), the number of times of switching further decreases. Therefore, it is possible to suppress a loss in the inverter 2. The same applies to a range other than the range in which the rotor rotating position θ is equal to or larger than 0 rad and equal to or smaller than π/3.

When a switching element including a wide-band gap semiconductor such as a silicon carbide (SiC) or gallium nitride (GaN) is applied to the upper-arm switching elements 3a to 3c and the lower-arm switching elements 3d to 3f and the carrier signal fc* is increased in frequency, the switching cycle decreases. A necessary minimum delay time (e.g., a sample hold time of an AD-converter sample hold circuit) is necessary to detect phase lower-arm voltages. Therefore, when the carrier signal fc* is increased in frequency, it is sometimes difficult to detect the phase lower-arm voltages.

Therefore, the time ratio of the outputs of the zero vectors V0 and V7 is changed to set time for outputting the zero vector V0 to be longer than the necessary minimum time for detecting the phase lower-arm voltages. Then, even when the carrier signal fc* is increased in frequency, it is possible to realize highly accurate computation based on the computation method for the phase currents iu, iv, and iw explained above.

As explained above, the power conversion device in the first embodiment includes the power-supply shunt resistor provided between the negative voltage side of the DC power supply and the inverter and the lower-arm shunt resistors respectively provided between the two phase lower arm switching elements among the three arms and the power-supply shunt resistor. The power conversion device detects the two phase lower-arm voltages, which are the voltages between the connection points of the phase lower-arm switching elements and the phase lower-arm shunt resistors and the negative voltage side of the DC power supply, and calculates, on the basis of the detection values of the phase lower-arm voltages, the phase currents flowing to the load device. Therefore, the number of the voltage detection units configured by the amplifying means can be two. Even in a configuration in which the phase lower-arm shunt resistors for two phases and the power-supply shunt resistor are provided in the same manner, it is possible to attain a further reduction in the size and a further reduction in the costs of the device than the conventional configuration in which three voltage detecting sections configured by amplifying means are necessary.

In the technique described in the above Patent Literature 1, it is necessary to take the voltage across both the ends of the lower-arm shunt resistor and the voltage across both the ends of the power-supply shunt resistor into the control means. However, when resistance values are different in the lower-arm shunt resistor and the power-supply shunt resistor, there is a problem in that fluctuation in detection values due to hardware increases if gains are also different in amplifying means for amplifying the voltage across both the ends of the lower-arm shunt resistor and amplifying means for amplifying the voltage across both the ends of the power-supply shunt resistor. However, with the power conversion device in the first embodiment, the phase currents can be calculated on the basis of the two phase lower-arm voltages. Therefore, it is possible to reduce the influence of the fluctuation in the detection values due to the hardware.

In the technology described in the above Patent Literature 1, a control procedure is complicated because a phase current that cannot be detected by the lower-arm shunt resistor is detected by the power-supply shunt resistor. However, with the power conversion device in the first embodiment, it is possible to calculate the phase currents without detecting the voltage of the power-supply shunt resistor. Therefore, it is possible to simplify the control procedure.

With the power conversion device in the first embodiment, the ratio of the time in which all of the upper-arm switching elements are in the ON state and the time in which all of the lower-arm switching elements are in the ON state in one cycle of the switching of the inverter is changed. Therefore, it is possible to flexibly cope with the increase in the frequency of the carrier signal fc*.

Note that, if the ratio is changed to set the time in which all of the lower-arm switching elements are in the ON state to be longer than the time in which all of the upper-arm switching elements are in the ON state in one cycle of the switching of the inverter, even when the carrier signal fc* is increased in frequency, it is possible to realize highly accurate computation.

If the ratio is changed to reduce the time in which all of the upper-arm switching elements are in the ON state in one cycle of the switching of the inverter to zero, it is possible to suppress a loss of the inverter through a reduction in the number of times of switching.

If the ratio is changed according to an operation state (e.g., a modulation ratio) of the inverter, it is possible to perform flexible operation of the device. Note that, if a table associated with the modulation ratio is prepared, it is possible to reduce a computation time required for selection of a ratio corresponding to the modulation ratio.

Second Embodiment

In the first embodiment, the method of connecting the lower-arm shunt resistors to the lower-arm switching elements of the two phases among the U phase, the V phase, and the W phase and detecting the lower-arm voltages of the two phases to thereby calculate the phase currents iu, iv, and iw flowing to the load device is explained. In this embodiment, a method of connecting the lower-arm shunt resistors to the phase lower-arm switching elements of the U phase, the V phase, and the W phase and detecting the lower-arm voltages of the three phases to calculate the phase currents iu, iv, and iw flowing to the load device is explained.

Figure 12:
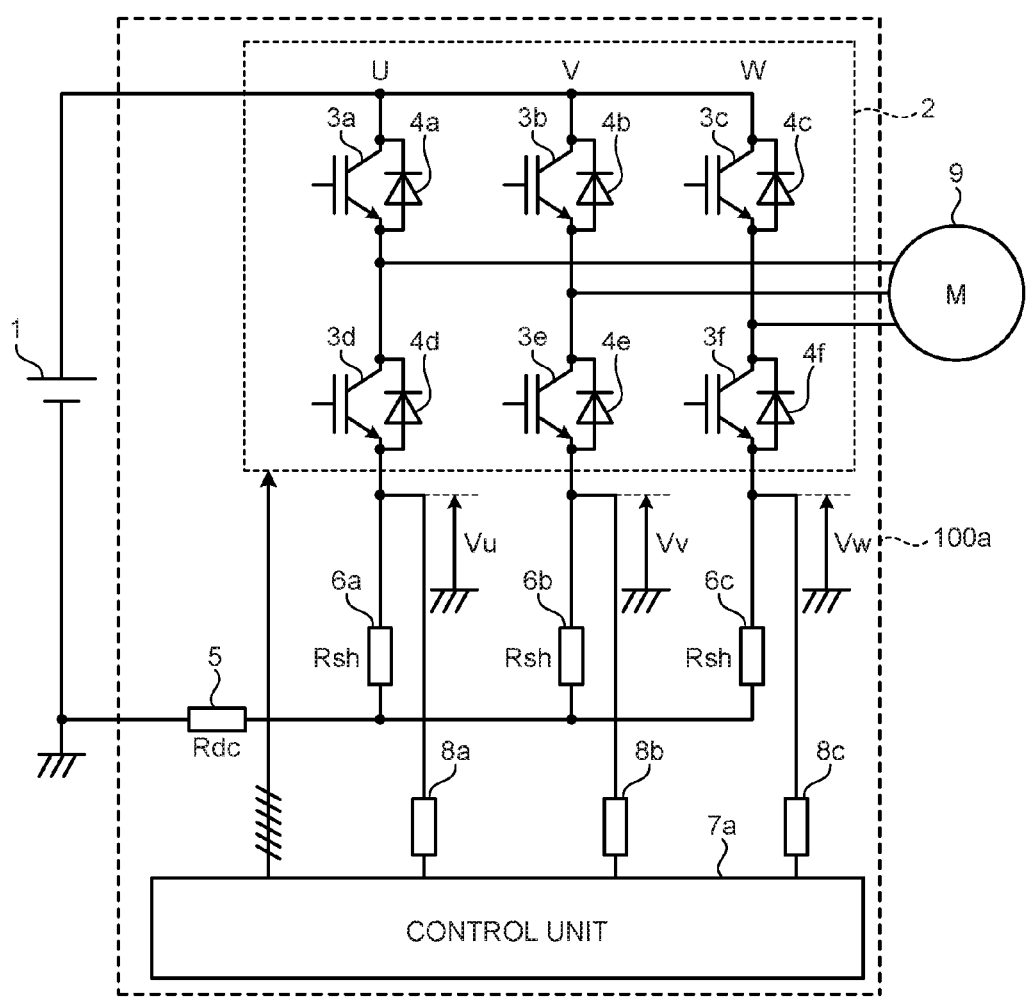
FIG. 12 is a diagram showing a configuration example of a power conversion device according to a second embodiment.

FIG. 12 is a diagram showing a configuration example of a power conversion device according to the second embodiment. Note that components same as or equivalent to the components in the first embodiment are denoted by the same reference numerals and signs and detailed explanation of the components is omitted.

A power conversion device 100a according to the second embodiment includes, in addition to the components in the first embodiment, a W-phase lower-arm shunt resistor 6c provided between the W-phase lower-arm switching element 3f and the power-supply shunt resistor 5 and a W-phase lower-arm voltage detection unit 8c that detects a voltage (a W-phase lower-arm voltage) Vw between a connection point of the W-phase lower-arm switching element 3f and the W-phase lower-arm shunt resistor 6c and the negative voltage side (GND) of the DC power supply 1. Note that, in the example shown in FIG. 12, a resistance value of the W-phase lower-arm shunt resistor 6c is represented as Rsh like the resistance values of the lower-arm shunt resistors 6a and 6b.

Like the U-phase lower-arm voltage detection unit 8a and the V-phase lower-arm voltage detection unit 8b, the W-phase lower-arm voltage detection unit 8c is configured by amplifying means for changing the W-phase lower-arm voltage Vw to a voltage value easily treated by a control unit 7a.

Figure 13:
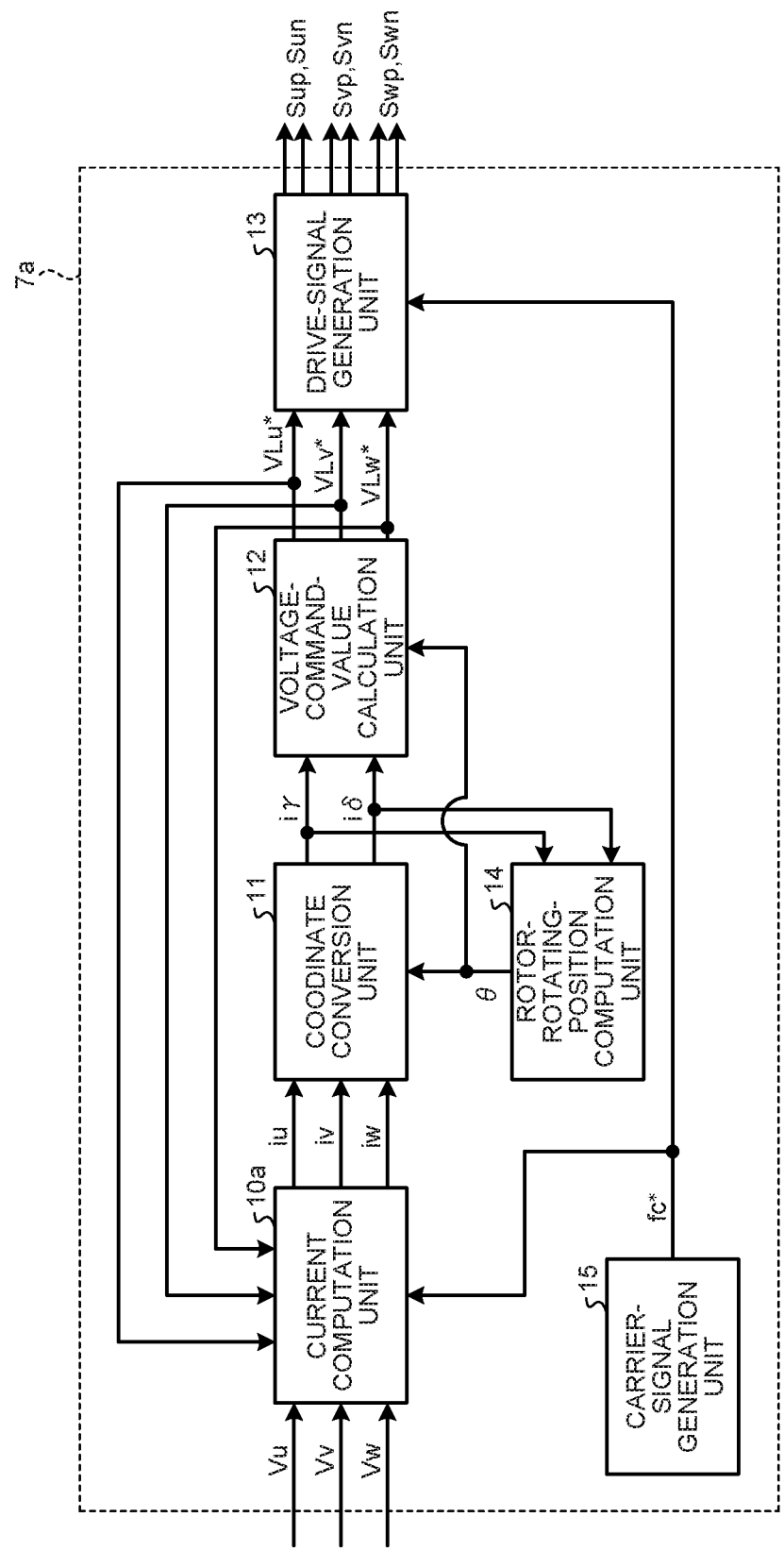
FIG. 13 is a diagram showing a configuration example of a control unit of the power conversion device according to the second embodiment.

FIG. 13 is a diagram showing a configuration example of the control unit of the power conversion device according to the second embodiment. The control unit 7a of the power conversion device 100a according to the second embodiment includes, instead of the current computation unit 10 in the first embodiment, a current computation unit 10a that computes, on the basis of the phase lower-arm voltages Vu, Vv, and Vw detected by the phase lower-arm voltage detection units 8a, 8b, and 8c, the phase currents iu, iv, and iw flowing to the phase winding wires of the motor 9.

A computation method for the phase currents in the power conversion device 100a according to the second embodiment is explained with reference to FIG. 14 to FIG. 20.

Figure 14:
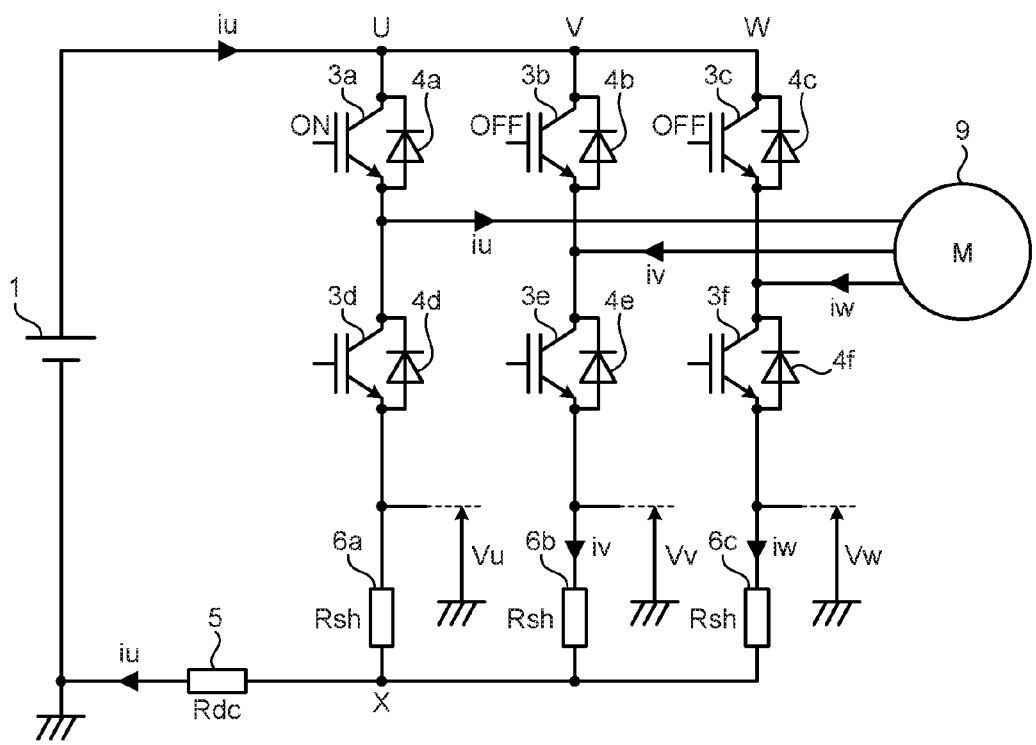
FIG. 14 is a diagram showing electric currents flowing to units of an inverter when an output voltage vector of the inverter is the real vector V1 (100).

FIG. 14 is a diagram showing electric currents flowing to the units of the inverter when the output voltage vector of the inverter is the real vector V1 (100). In an example shown in FIG. 14, electric currents flowing from the high-potential side to the low-potential side of the phase winding wires of the motor 9 are respectively represented as iu, iv, and iw. Note that, in examples shown in the figures referred to below, descriptions are the same as the description in FIG. 14.

As shown in FIG. 14, when the output voltage vector of the inverter 2 is the real vector V1 (100), the U-phase current iu flows from the positive voltage side of the DC power supply 1 to the motor 9 via the U-phase upper-arm switching element 3a, the V-phase current iv flows from the motor 9 to the negative voltage side of the DC power supply 1 via the V-phase lower-arm switching element 3e, the V-phase lower-arm shunt resistor 6b, and the power-supply shunt resistor 5, and the W-phase current iw flows to the negative voltage side of the DC power supply 1 via the W-phase lower-arm switching element 3f, the W-phase lower-arm shunt resistor 6c, and the power-supply shunt resistor 5. At this point, the U-phase lower-arm voltage Vu, the V-phase lower-arm voltage Vv, and the W-phase lower-arm voltage Vw can be represented by the following Formulas (25), (26), and (27).

$$Vu = iu \times Rdc \quad (25)$$

$$Vv = iu \times Rdc + iv \times Rsh \quad (26)$$

$$Vw = iu \times Rdc + iw \times Rsh \quad (27)$$

That is, the phase currents iu, iv, and iw can be calculated using the above Formulas (25), (26), and (27).

Figure 15:
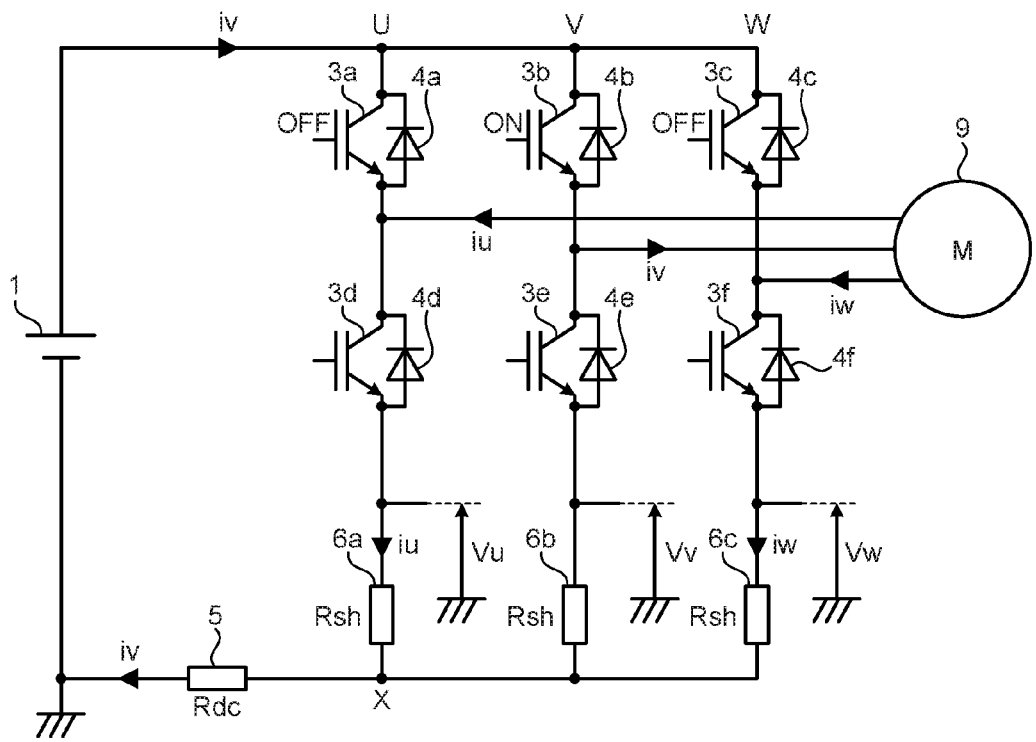
FIG. 15 is a diagram showing electric currents flowing to the units of the inverter when the output voltage vector of the inverter is the real vector V2 (010).

FIG. 15 is a diagram showing electric currents flowing to the units of the inverter when the output voltage vector of the inverter is the real vector V2 (010).

As shown in FIG. 15, when the output voltage vector of the inverter 2 is the real vector V2 (010), the V-phase current iv flows from the positive voltage side of the DC power supply 1 to the motor 9 via the V-phase upper-arm switching element 3b, the U-phase current iu flows from the motor 9 to the negative voltage side of the DC power supply 1 via the U-phase lower-arm switching element 3d, the U-phase lower-arm shunt resistor 6a, and the power-supply shunt resistor 5, and the W-phase current iw flows to the negative voltage side of the DC power supply 1 via the W-phase lower-arm switching element 3f, the W-phase lower-arm shunt resistor 6c, and the power-supply shunt resistor 5. At this point, the U-phase lower-arm voltage Vu, the V-phase lower-arm voltage Vv, and the W-phase lower-arm voltage Vw can be represented by the following Formulas (28), (29), and (30).

$$Vu = iv \times Rdc + iu \times Rsh \quad (28)$$

$$Vv = iv \times Rdc \quad (29)$$

$$Vw = iv \times Rdc + iw \times Rsh \quad (30)$$

That is, the phase currents iu, iv, and iw can be calculated using the above Formulas (28), (29), and (30).

Figure 16:
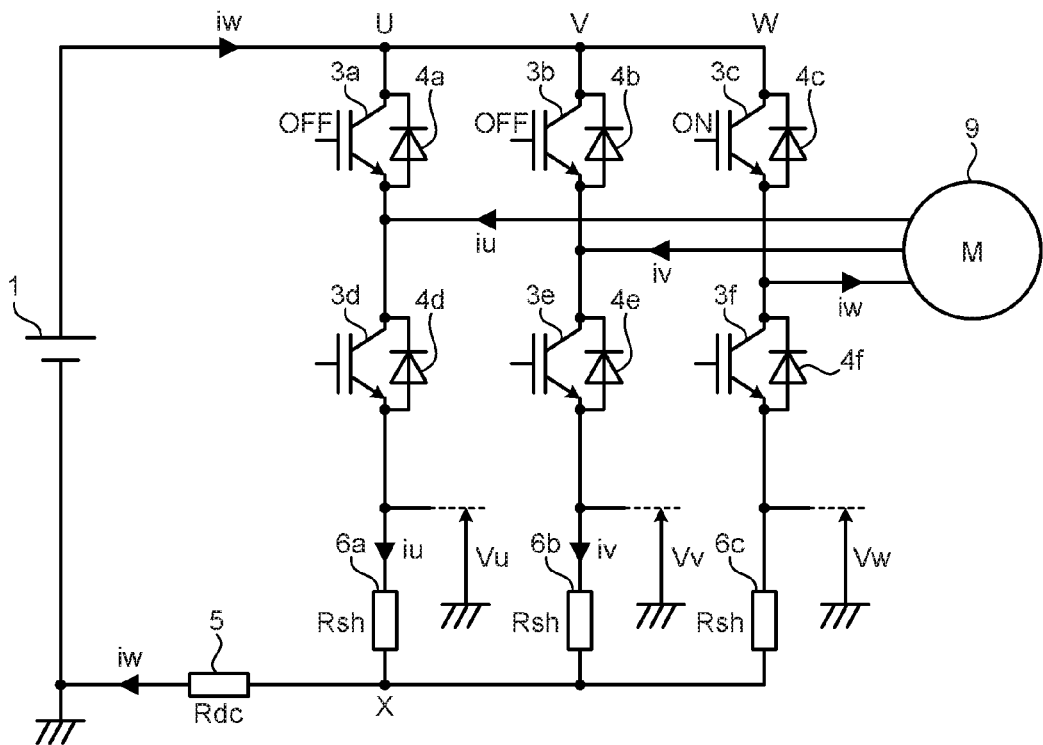
FIG. 16 is a diagram showing electric currents flowing to the units of the inverter when the output voltage vector of the inverter is the real vector V3 (001).

FIG. 16 is a diagram showing electric currents flowing to the units of the inverter when the output voltage vector of the inverter is the real vector V3 (001).

As shown in FIG. 16, when the output voltage vector of the inverter 2 is the real vector V3 (001), the W-phase current iw flows from the positive voltage side of the DC power supply 1 to the motor 9 via the W-phase upper-arm switching element 3c, the U-phase current iu flows from the motor 9 to the negative voltage side of the DC power supply 1 via the U-phase lower-arm switching element 3d, the U-phase lower-arm shunt resistor 6a, and the power-supply shunt resistor 5, and the V-phase current iv flows to the negative voltage side of the DC power supply 1 via the V-phase lower-arm switching element 3e, the V-phase lower-arm shunt resistor 6b, and the power-supply shunt resistor 5. At this point, the U-phase lower-arm voltage Vu, the V-phase lower-arm voltage Vv, and the W-phase lower-arm voltage Vw can be represented by the following Formulas (31), (32), and (33).

$$Vu = iw \times Rdc + iu \times Rsh \quad (31)$$

$$Vv = iw \times Rdc + iv \times Rsh \quad (32)$$

$$Vw = iw \times Rdc \quad (33)$$

That is, the phase currents iu, iv, and iw can be calculated using the above Formulas (31), (32), and (33).

Figure 17:
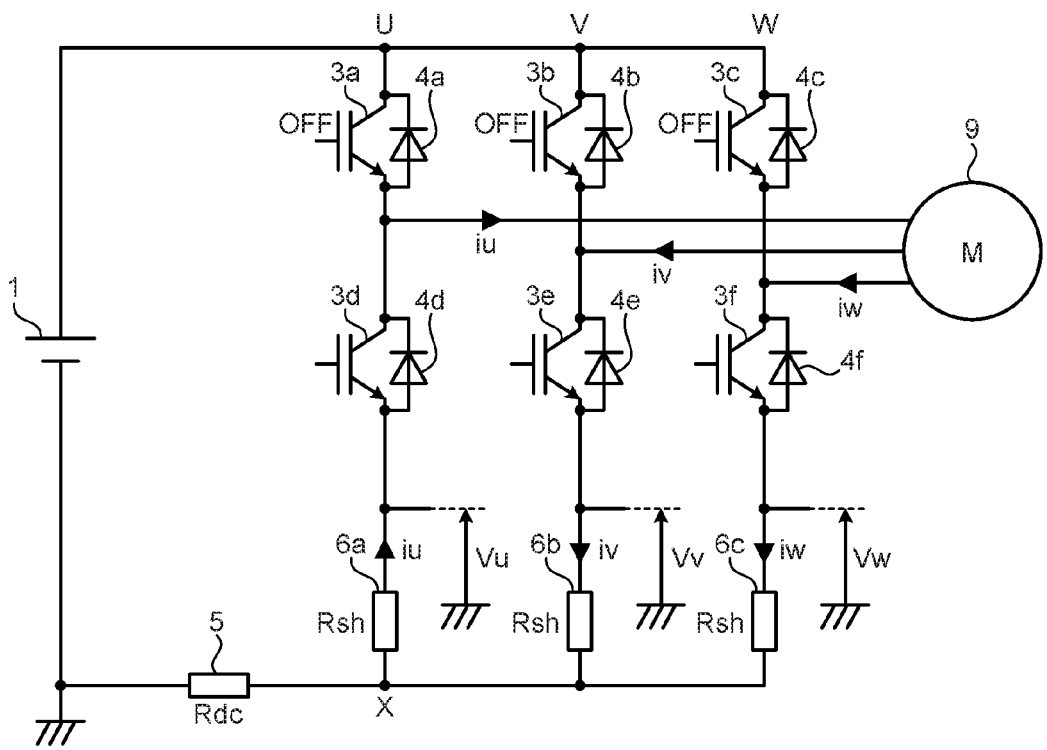
FIG. 17 is a diagram showing electric currents flowing to the units of the inverter when the output voltage vector of the inverter is the zero vector V0 (000).

FIG. 17 is a diagram showing electric currents flowing to the units of the inverter when the output voltage vector of the inverter is the zero vector V0 (000). In an example shown in FIG. 17, as an example, electric currents flowing to the inverter 2 when the output voltage vector shifts from the real vector V1 (100) to the zero vector V0 (000) is shown.

As shown in FIG. 17, when the output voltage vector of the inverter 2 shifts from the real vector V1 (100) to the zero vector V0 (000), an electric current hardly flows to the power-supply shunt resistor 5 and a voltage at the X point is approximately zero. At this point, the U-phase current iu flows from the X point to the motor 9 via the U-phase lower-arm shunt resistor 6a and the freewheeling diode 4d, the V-phase current iv flows from the motor 9 to the X point via the V-phase lower-arm switching element 3e and the V-phase lower-arm shunt resistor 6b, and the W-phase current iw flows to the X point via the W-phase lower-arm switching element 3f and the W-phase lower-arm shunt resistor 6c. At this point, the U-phase lower-arm voltage Vu, the V-phase lower-arm voltage Vv, and the W-phase lower-arm voltage Vw can be represented by the following Formulas (34), (35), and (36).

$$Vu = (-iu) \times Rsh \quad (34)$$

$$Vv = iw \times Rsh \quad (35)$$

$$Vw = iw \times Rsh \quad (36)$$

That is, the phase currents iu, iv, and iw can be calculated using the above Formulas (34), (35), and (36).

As explained above, in the power conversion device 100a according to this embodiment, when the output voltage vector of the inverter 2 is the real vectors V1 (100), V2 (010), and V3 (001) and the zero vector V0 (000), the phase currents iu, iv, and iw flowing to the phase winding wires of the motor 9 can be calculated by detecting the U-phase lower-arm voltage Vu, the V-phase lower-arm voltage Vv, and the W-phase lower-arm voltage Vw.

The phase currents iu, iv, and iw are obtained without using the first law of Kirchhoff and the equilibrium condition of phase currents. Therefore, the power conversion device 100a can also be applied even when the motor 9 is an unbalanced load.

Figure 18:
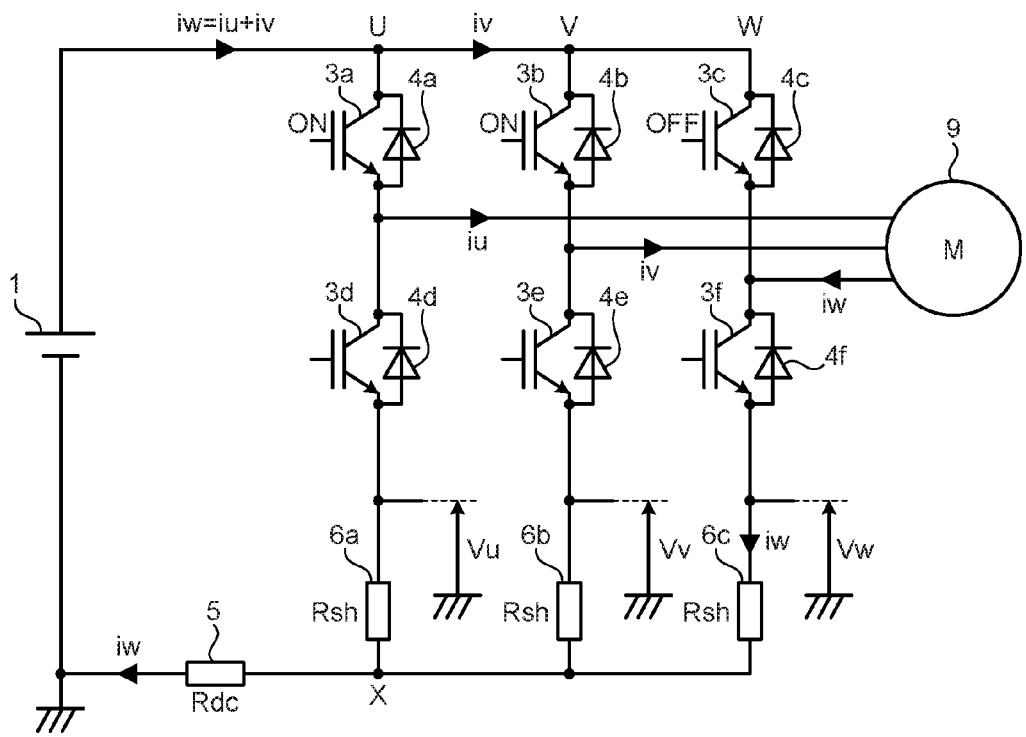
FIG. 18 is a diagram showing electric currents flowing to the units of the inverter when the output voltage vector of the inverter is the real vector V4 (110).

FIG. 18 is a diagram showing electric currents flowing to the units of the inverter when the output voltage vector of the inverter is the real vector V4 (110).

As shown in FIG. 18, when the output voltage vector of the inverter 2 is the real vector V4 (110), the U-phase current iu flows from the positive voltage side of the DC power supply 1 to the motor 9 via the U-phase upper-arm switching element 3a, the V-phase current iv flows to the motor 9 via the V-phase upper-arm switching element 3b, and the W-phase current iw flows from the motor 9 to the negative voltage side of the DC power supply 1 via the W-phase lower-arm switching element 3f, the W-phase lower-arm shunt resistor 6c, and the power-supply shunt resistor 5. At this point, the U-phase lower-arm voltage Vu, the V-phase lower-arm voltage Vv, and the W-phase lower-arm voltage Vw can be represented by the following Formulas (37), (38), and (39).

$$Vu = iw \times Rdc \quad (37)$$

$$Vv = iw \times Rdc \quad (38)$$

$$Vw = iw \times Rdc + iw \times Rsh \quad (39)$$

When the motor 9 is the three-phase balanced load, according to the equilibrium condition of phase currents, the following formula is led.

$$iu + iv = iw \quad (40)$$

$$iu = iv = (1/2)iw \quad (41)$$

That is, when the motor 9 is the three-phase balanced load, the phase currents iu, iv, and iw can be calculated using any one of the above Formulas (37), (38), and (39) and Formula (41).

Figure 19:
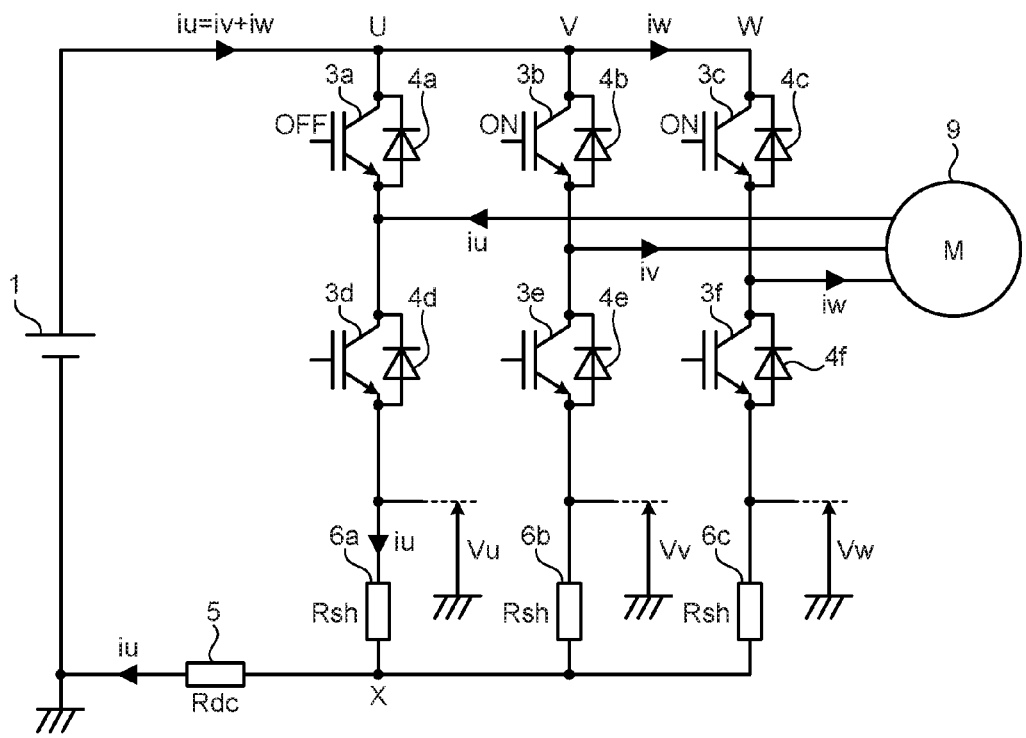
FIG. 19 is a diagram showing electric currents flowing to the units of the inverter when the output voltage vector of the inverter is the real vector V5 (011).

FIG. 19 is a diagram showing electric currents flowing to the units of the inverter when the output voltage vector of the inverter is the real vector V5 (011).

As shown in FIG. 19, when the output voltage vector of the inverter 2 is the real vector V5 (011), the V-phase current iv flows from the positive voltage side of the DC power supply 1 to the motor 9 via the V-phase upper-arm switching element 3b, the W-phase current iw flows to the motor 9 via the W-phase upper-arm switching element 3c, and the U-phase current iu flows from the motor 9 to the negative voltage side of the DC power supply 1 via the U-phase lower-arm switching element 3d, the U-phase lower-arm shunt resistor 6a, and the power-supply shunt resistor 5. At this point, the U-phase lower-arm voltage Vu, the V-phase lower-arm voltage Vv, and the W-phase lower-arm voltage Vw can be represented by the following Formulas (42), (43), and (44).

$$Vu = iu \times Rdc + iu \times Rsh \quad (42)$$

$$Vv = iu \times Rdc \quad (43)$$

$$Vw = iu \times Rdc \quad (44)$$

When the motor 9 is the three-phase balanced load, according to the equilibrium condition of phase currents, the following formula is led.

$$iv + iw = iu \quad (45)$$

$$iv = iw = (1/2)iu \quad (46)$$

That is, when the motor 9 is the three-phase balanced load, the phase currents iu, iv, and iw can be calculated using any one of the above Formulas (42), (43), and (44) and Formula (46).

Figure 20:
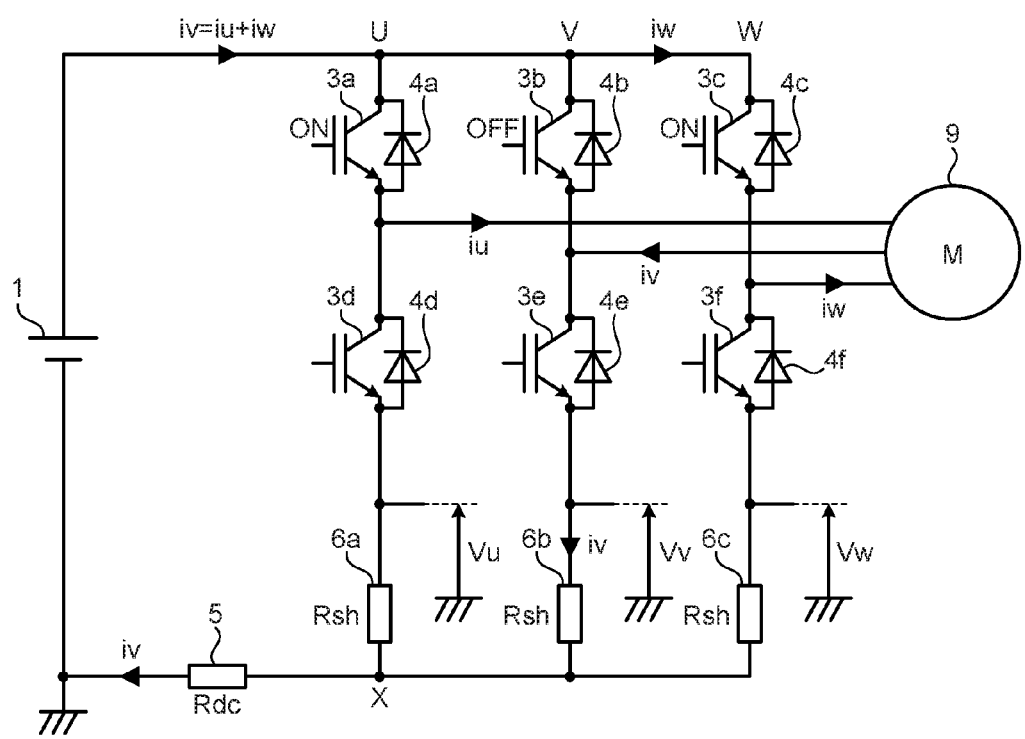
FIG. 20 is a diagram showing electric currents flowing to the units of the inverter when the output voltage vector of the inverter is the real vector V6 (101).

FIG. 20 is a diagram showing electric currents flowing to the units of the inverter when the output voltage vector of the inverter is the real vector V6 (101).

As shown in FIG. 20, when the output voltage vector of the inverter 2 is the real vector V6 (101), the U-phase current iu flows from the positive voltage side of the DC power supply 1 to the motor 9 via the U-phase upper-arm switching element 3a, the W-phase current iw flows to the motor 9 via the W-phase upper-arm switching element 3c, and the V-phase current iv flows from the motor 9 to the negative voltage side of the DC power supply 1 via the V-phase lower-arm switching element 3e, the V-phase lower-arm shunt resistor 6b, and the power-supply shunt resistor 5. At this point, the U-phase lower-arm voltage Vu, the V-phase lower-arm voltage Vv, and the W-phase lower-arm voltage Vw can be represented by the following Formulas (47), (48), and (49).

$$Vu = iv \times Rdc \quad (47)$$

$$Vv = iv \times Rdc + iv \times Rsh \quad (48)$$

$$Vw = iv \times Rdc \quad (49)$$

When the motor 9 is the three-phase balanced load, according to the equilibrium condition of phase currents, the following formula is led.

$$iu + iw = iv \quad (50)$$

$$iu = iw = (1/2)iv \quad (51)$$

That is, when the motor 9 is the three-phase balanced load, the phase currents iu, iv, and iw can be calculated using any one of the above Formulas (47), (48), and (49) and Formula (51).

As explained above, when the output voltage vector of the inverter 2 is the real vector V4 (110), V5 (011), and V6 (101) as well, when the motor 9 is the three-phase balanced load, the phase currents iu, iv, and iw flowing to the phase winding wires of the motor 9 can be calculated by detecting any one of the U-phase lower-arm voltage Vu, the V-phase lower-arm voltage Vv, and the W-phase lower-arm voltage Vw.

As explained above, in the power conversion device in the second embodiment, as opposed to the configuration in the first embodiment, the lower-arms shunt resistors are provided for three phases. The power conversion device detects the three phase lower-arm voltages, which are the voltages between the connection points of the phase lower-arm switching elements and the lower-arm shunt resistors and the negative voltage side of the DC power supply, and calculates, on the basis of the detection values of the phase lower-arm voltages, the phase currents flowing to the load device. Therefore, although the number of the voltage detection units configured by the amplifying means is three, it is possible to attain a further reduction in the size and a further reduction in the costs of the device in comparison with the conventional configuration in which it is required to provide four voltage detection units including amplification units, even if the lower-arm shunt resistors for three phases and the power-supply shunt resistor are provided in the same manner.

As in the first embodiment, not only when the output voltage vector of the inverter is the zero vector V0 but also when the output voltage vector of the inverter is the real vectors V1 to V6, the phase currents can be calculated. Therefore, it is possible to attain improvement of accuracy of the control based on the phase currents.

Further, when the output voltage vector of the inverter is the zero vector V0 and the real vectors V1 to V3, the phase currents can be obtained without using the first law of Kirchhoff and the equilibrium condition of phase currents. Therefore, the power conversion device can also be applied even when the load device is an unbalanced load.

As in the first embodiment, when the time ratio of the outputs of the zero vectors V0 and V7 is changed, in one cycle of the carrier signal fc*, because types of voltage vectors output by the inverter 2 decrease, the number of times of switching also decreases. It is possible to suppress a loss in the inverter 2.

As an example, a range in which the rotor rotating position θ is equal to or larger than 0 rad and equal to or smaller than π/3 is explained. When the time ratio of the outputs of the zero vectors V0 and V7 is set to 1:1, the inverter 2 switches the output voltage vectors in the order of V0 (000)→V1 (100)→V4 (110)→V7 (111)→V4 (110)→V1 (100)→V0 (000). On the other hand, when the time ratio of the outputs of the zero vectors V0 and V7 is set to 1:0, the inverter 2 switches the output voltage vectors in the order of V0 (000)→V1 (100)→V4 (110)→V4 (110)→V1 (100) →V0 (000). Therefore, when the time ratio of the outputs of the zero vectors V0 and V7 is set to 1:0, the number of times of switching further decreases. Therefore, it is possible to suppress a loss in the inverter 2. The same applies to a range other than the range in which the rotor rotating position θ is equal to or larger than 0 rad and equal to or smaller than π/3.

As in the first embodiment, when a switching element including a wide-band gap semiconductor such as a silicon carbide (SiC) or gallium nitride (GaN) is applied to the upper-arm switching elements 3a to 3c and the lower-arm switching elements 3d to 3f and the carrier signal fc* is increased in frequency, the switching cycle decreases. A necessary minimum delay time (e.g., a sample hold time of an AD-converter sample hold circuit) is necessary to detect phase lower-arm voltages. Therefore, when the carrier signal fc* is increased in frequency, it is sometimes difficult to detect the phase lower-arm voltages.

Therefore, the time ratio of the outputs of the zero vectors V0 and V7 is changed to set time for outputting the zero vector V0 to be longer than the necessary minimum time for detecting the phase lower-arm voltages. Then, even when the carrier signal fc* is increased in frequency, it is possible to realize highly accurate computation based on the computation method for the phase currents iu, iv, and iw explained above.

In the embodiment explained above, the power conversion device targeting the three-phase motor using the three-phase alternating current is explained as the example. However, the present invention is not limited to the three phases and is also applicable to power conversion devices targeting single-phase and multi-phase alternating current motors.

Note that, by applying the power conversion device explained in the embodiments above to a motor driving device that drives a motor as a load and applying the motor driving device to a blower and a compressor of an air conditioner, a refrigerator, a freezer, and the like, it is possible to attain a reduction in the sizes, a reduction in the costs, and improvement of accuracy of control of the motor driving device, the blower, the compressor, the air conditioner, the refrigerator, and the freezer.

It goes without saying that the configuration explained in the embodiments above is an example of the configuration of the present invention and can be combined with other publicly-known technologies and can be changed by, for example, omitting a part of the configuration in a range not departing from the spirit of the present invention.

INDUSTRIAL APPLICABILITY

As explained above, the power conversion device, the motor driving device including the power conversion device, the blower and the compressor including the motor driving device, and the air conditioner, the refrigerator, and the freezer including the blower and the compressor are useful for a configuration including a three-phase inverter of a PWM modulation system and are, in particular, suitable as a technology capable of extending a detection period of the phase currents and attaining improvement of accuracy of control based on the phase currents without causing an increase in the size and an increase in the costs of the device.

The invention claimed is:

1. A power conversion device that converts DC power supplied from a DC power supply into AC power, the power conversion device comprising:
an inverter configured by connecting, in parallel, arms including phase upper-arm switching elements and phase lower-arm switching elements;
a power-supply shunt resistor provided between a negative voltage side of the DC power supply and the inverter;
lower-arm shunt resistors respectively provided between the phase lower-arm switching elements for at least two phases and the power-supply shunt resistor;
a voltage detector that detects voltages between connection points of the phase lower-arm switching elements and the lower-arm shunt resistors and the negative voltage side of the DC power supply; and
a control unit that generates drive signals corresponding to the phase upper-arm switching elements and the phase lower-arm switching elements from detection values of the voltage detector, wherein
the power conversion device changes a ratio of time in which all of the upper-arm switching elements are in an ON state and time in which all of the lower-arm switching elements are in the ON state in one cycle of switching of the inverter according to a modulation ratio.

2. The power conversion device according to claim 1, wherein the power conversion device changes the ratio to set the time in which all of the lower-arm switching elements are in the ON state to be longer than the time in which all of the upper-arm switching elements are in the ON state in one cycle of the switching of the inverter.

3. The power conversion device according to claim 1, wherein the power conversion device changes the ratio to set the time in which all of the upper-arm switching elements are in the ON state in one cycle of the switching of the inverter to zero.

4. The power conversion device according to claim 1, wherein the power conversion device changes the ratio according to an operation state of the inverter.

5. The power conversion device according to claim 1, wherein the operation state is a modulation rate of the inverter.

6. The power conversion device according to claim 1, wherein the power conversion device selects the ratio according to the modulation ratio on the basis of a table associated with the modulation ratio.

7. The power conversion device according to claim 1, wherein the control unit calculates, from the detection values of the voltage detector, phase currents flowing to a load device and generates the drive signals on the basis of the phase currents.

8. The power conversion device according to claim 1, wherein the control unit sets, as a detection period for the detection values of the voltage detector, a period in which at least one of the phase lower-arm switching elements is in an ON state.

9. The power conversion device according to claim 1, wherein a wide-band gap semiconductor element is used in at least one of the upper-arm switching elements and the lower-arm switching elements.

10. A motor driving device comprising the power conversion device according to claim 1.

11. A blower comprising the motor driving device according to claim 10.

12. An air conditioner comprising the blower according to claim 11.

13. A refrigerator comprising the blower according to claim 11.

14. A freezer comprising the blower according to claim 11.

15. A compressor comprising the motor driving device according to claim 10.

16. An air conditioner comprising the compressor according to claim 15.

17. A refrigerator comprising the compressor according to claim 15.

18. A freezer comprising the compressor according to claim 15.

* * * * *